United States Patent
Yoo

[11] Patent Number: 5,927,631
[45] Date of Patent: Jul. 27, 1999

[54] VIDEO CASSETTE RECORDER EQUIPPED WITH A TAPE TENSION ADJUSTING DEVICE

[75] Inventor: Hyo-Jong Yoo, Seoul, Rep. of Korea

[73] Assignee: Daewoo Electronics Co., Ltd., Seoul, Rep. of Korea

[21] Appl. No.: 08/935,426

[22] Filed: Sep. 23, 1997

[30] Foreign Application Priority Data

Sep. 30, 1996 [KR] Rep. of Korea ............... 96-43323

[51] Int. Cl.$^6$ .................. B65H 59/38; B65H 23/06; E05F 1/08
[52] U.S. Cl. .................. 242/334.6; 242/417.3; 242/421.8; 16/299
[58] Field of Search .................. 242/417.3, 421.8, 242/421.9, 422.8, 343.2, 334.6; 16/299, 308

[56] References Cited

U.S. PATENT DOCUMENTS

| | | | |
|---|---|---|---|
| 4,174,078 | 11/1979 | Brooks | 242/421.8 |
| 4,350,454 | 9/1982 | Schoenlein | 242/421.8 X |
| 4,958,782 | 9/1990 | Dannett et al. | 242/421.8 X |
| 5,445,337 | 8/1995 | Kwon . | |
| 5,504,635 | 4/1996 | Lee | 242/334.6 X |
| 5,642,865 | 7/1997 | Fell et al. | 242/334.6 |
| 5,772,142 | 6/1998 | Ahn | 242/334.6 |

FOREIGN PATENT DOCUMENTS 9212952 8/1997 Japan .

*Primary Examiner*—Michael Mansen
*Attorney, Agent, or Firm*—Anderson, Kill & Olick, P.C.

[57] ABSTRACT

A video cassette recorder is equipped with a tape tension adjusting device which includes a tension lever having a tension pole coming into contact with a tape and rotatably mounted on the deck to be biased toward the tape by a torsion spring, and an eccentric cam having a cylindrical body and a shaft eccentrically extending from the cylindrical body and rotatably mounted on the deck through the shaft. One end of the torsion spring comes into contact with the pressed piece and the other end thereof comes into contact with the cylindrical body of the eccentric cam in such a way that the pressing force of the tension pole against the tape changes with the eccentric cam.

5 Claims, 3 Drawing Sheets

VIDEO CASSETTE RECORDER EQUIPPED WITH A TAPE TENSION ADJUSTING DEVICE

FIELD OF THE INVENTION

The present invention relates to a video cassette recorder having a tape tension adjusting device; and, more particularly, to a tape tension adjusting device capable of adjusting the tape tension with a greater precision.

BACKGROUND OF THE INVENTION

Generally, in a video cassette recorder, the tension of a tape running between a take-up reel and a supply reel must be constantly controlled or adjusted to a desired level depending on the operating mode of the video cassette recorder. For this reason, various types of tape tension adjusting devices have been proposed and employed to adjust the tension of the running magnetic tape.

One of the prior art tape tension adjusting devices is illustrated in FIG. 1. In the illustrated device, after a magnetic tape T is arranged onto a predetermined travel path between a supply reel 11 and a take-up reel (not shown), a tension lever 1 pivotally mounted on a deck 10 through a hinge 3 is permitted to be biased toward the magnetic tape T by a spring 4. The tension lever 1 has at its distal end a tension pole 2 for pressing the running magnetic tape T. The tension pole 2 presses the magnetic tape T in response to the rotation of the tension lever 1, as represented with an arrow, thereby forcing a band brake 5, whose one end is connected to the tension lever 1 through a first band holder 6, into an operative position. At the operative position, the band brake 5 exerts a braking force on the supply reel 11 in response to a further rotation of the tension lever 1. The band brake 5 is supported at the other end thereof by a second band holder 7 mounted on the deck.

On the other hand, one end of the above-mentioned spring is fixed at a protuberance 8 provided on a proximal end of the tension lever 1 and the other end thereof is fixed at a hook 9 mounted on the deck 10. The hook 9 is provided with three anchor portions 9a, 9b, 9c, each of which has a different distance from the protuberance 8. This arrangement allows the tape tension adjusting range of the tension lever 1 to be changed by having the one end of the spring 4, which is fixed to one of the anchor portions 9a, 9b, 9c of the hook 9, fixed to any other anchor portion.

However, in such a tension adjusting device, the tape tension of the tension lever is changed incrementally due to the set distance between the anchor portions of the hook, which, in turn, prevents the tape tension to be adjusted with a greater precision.

SUMMARY OF THE INVENTION

It is, therefore, a primary object of the invention to provide a tape tension adjusting device capable of adjusting the tape tension with a greater precision.

In accordance with one aspect of the present invention, there is provided a video cassette recorder equipped with a tape tension adjusting device, characterized in that the device comprises a tension lever rotatably mounted on a deck to be biased toward a tape by a torsion spring, and having a tension pole coming into contact with the tape, and an eccentric cam including a cylindrical body and a shaft eccentrically extending from the cylindrical body, and mounted on the deck through the shaft, wherein one end of the torsion spring comes into contact with the tension pole and the other end thereof comes into contact with the cylindrical body of the eccentric cam in such a way that the pressing force of the tension lever against the tape changes with the eccentric cam.

BRIEF DESCRIPTION OF THE DRAWINGS

The above and other objects and features of the instant invention will become apparent from the following description of preferred embodiments taken in conjunction with the accompanying drawings, in which.

DETAILED DESCRIPTION OF THE PREFERRED EMBODIMENTS

Figure 1:
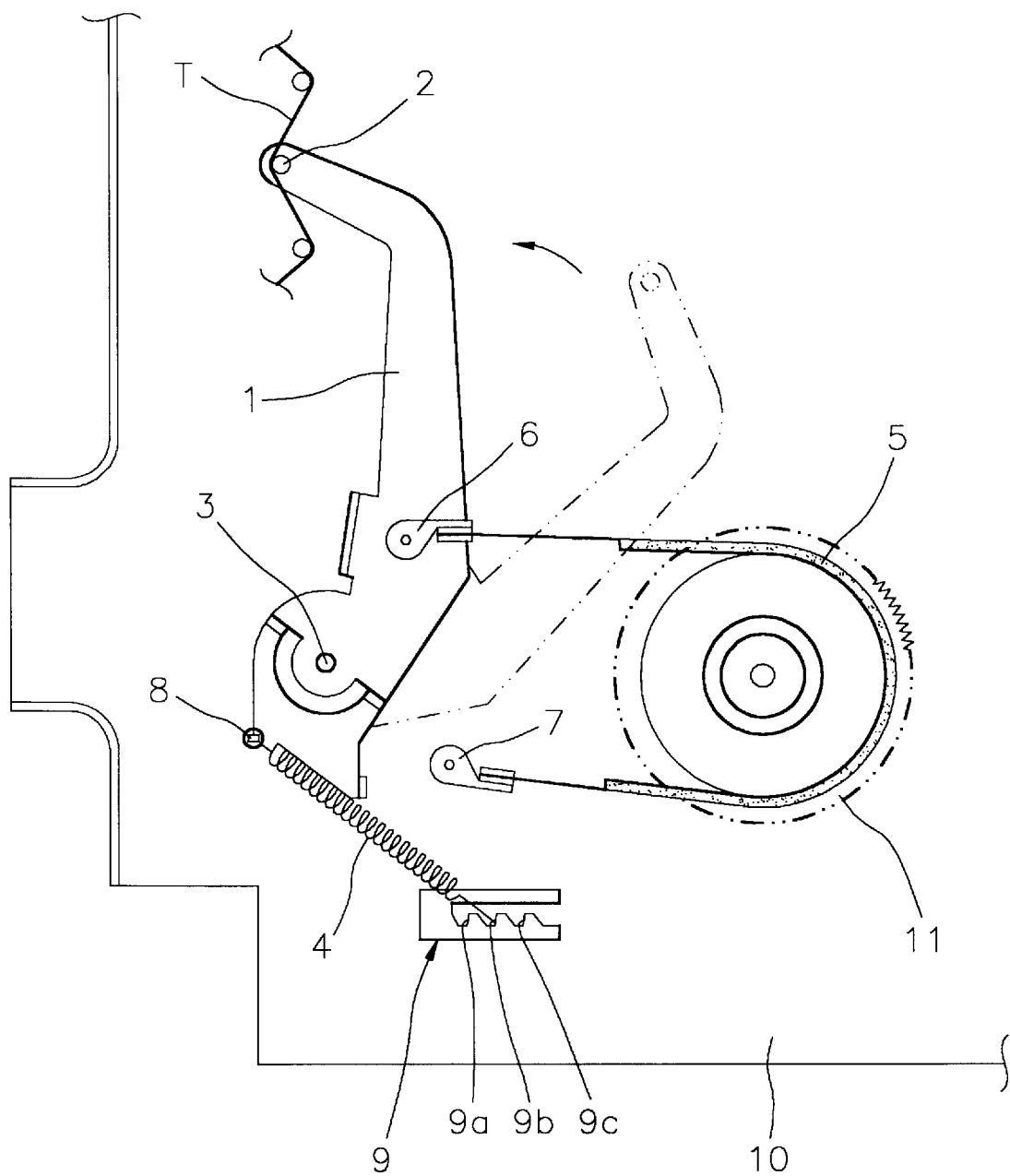
FIG. 1 shows a top plan view of the conventional tape tension adjusting device.
Figure 2:
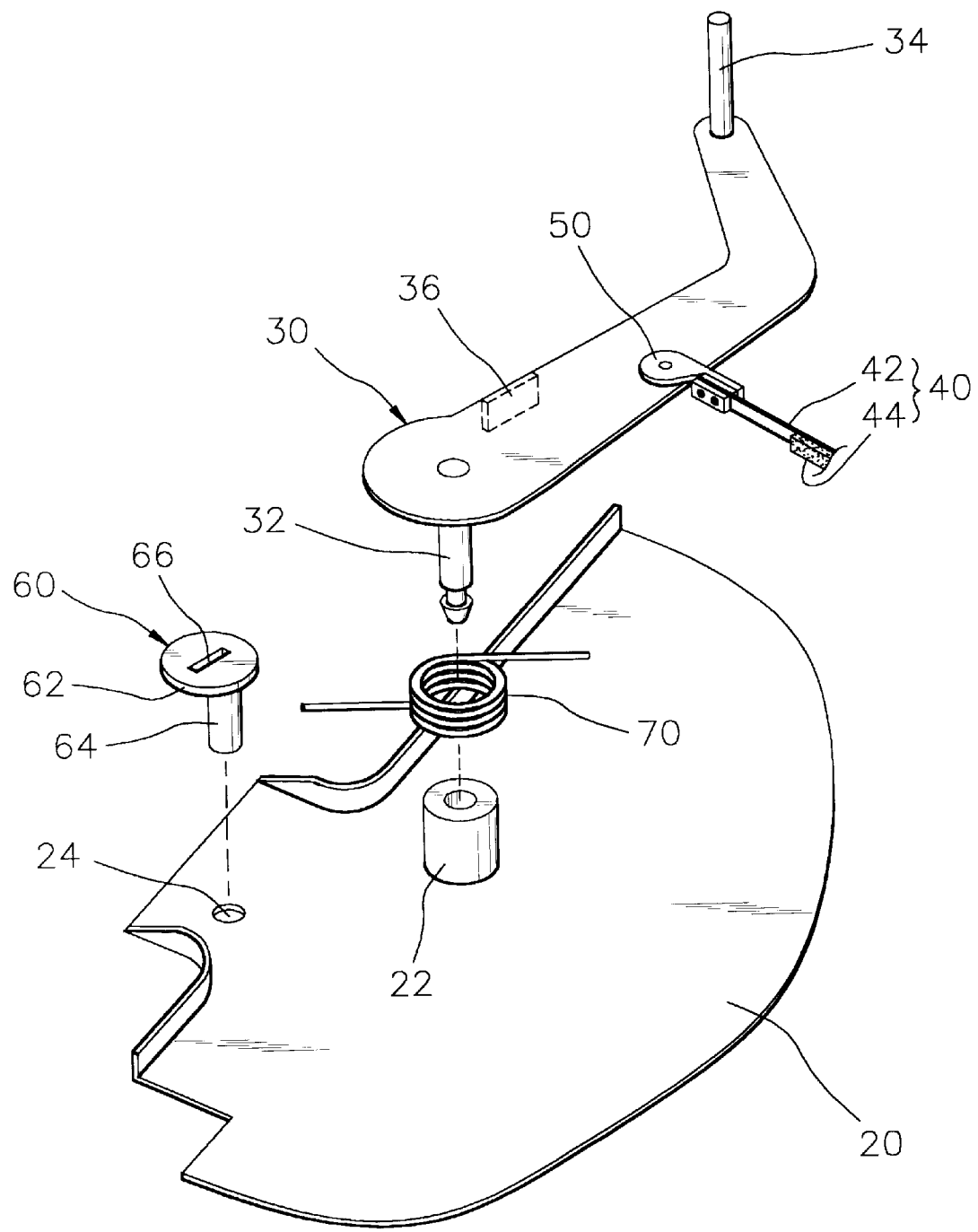
FIG. 2 illustrates an exploded view of a tape tension adjusting device in accordance with the present invention.
Figure 3:
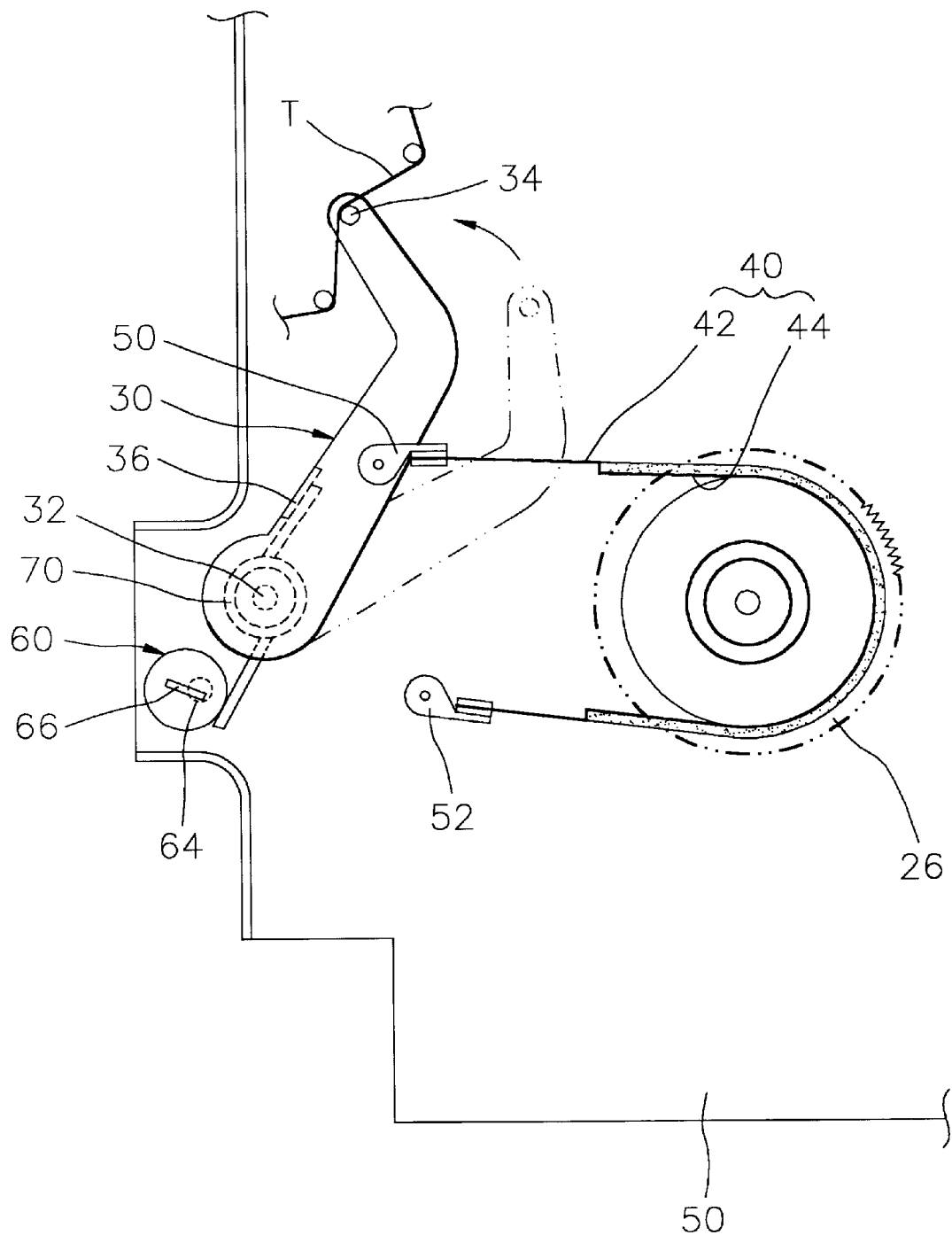
FIG. 3 represents a top plan view of the tape tension adjusting device in accordance with the present invention.

Referring to FIGS. 2 and 3, the inventive tape tension adjusting device for use in a video cassette recorder includes a tension lever 30, a band brake 40 and an eccentric cam 60.

The tension lever 30 is pivotably mounted on a deck 20 by inserting its shaft 32 into a boss 22 of the deck 20. The tension lever 30 has a tension pole 34 coming into contact with a tape at its distal end and a pressed piece 36. The tension pole 34 serves to press the tape T.

The band brake 40 for exerting a braking force on a supply reel 26 includes a film 42 and a felt portion 44 attached on an inner part of the film 42. The felt portion 44 serves as a friction surface with the supply reel 26 when the band brake 40 applies a braking force on the supply reel 26. As shown in FIG. 3, one end of the band brake 40 is fixed to the tension lever 30 through a first band holder 50 and the other end thereof is fixed to the deck 20 through a second band holder 52.

The eccentric cam 60 for allowing the tension lever 30 to adjust the tape tension with a greater precision includes a cylindrical body 62 and a shaft 64 eccentrically extending from the cylindrical body 62. The eccentric cam 60 is rotatably mounted on the deck 20 by fitting the eccentric shaft 64 into a hole 24 of the deck 20. Furthermore, the eccentric cam 60 has a groove 66 for facilitating the turning thereof at top of the cylindrical body 62.

The inventive tape tension adjusting device, further, includes a resilient means, e.g., a torsion spring 70. The torsion spring 70 is arranged around the boss 22 of the deck 20, wherein one end of the torsion spring 70 comes into contact with the pressed piece 36 of the tension lever 30 so as to apply a pressure against the pressed piece 36 and the other end thereof comes into contact with the periphery of the cylindrical body 62 of the eccentric cam 60. This arrangement allows the tension lever 30 to adjust the tape tension with a greater precision.

An operation of the inventive tape tension adjusting device designed in this manner will now be described with reference to FIG. 3.

Initially, since, e.g., a mode change moving plate (not shown) located beneath the deck 20 hinders the counterclockwise rotation of the tension lever 30, the tension lever 30 is forced to be positioned at a retreated position, as represented by a phantom line. Thereafter, the movement of the mode change moving plate permits the magnetic tape T to be loaded onto its travel path from a tape cassette (not shown) inserted into the video cassette recorder and the tension lever 30 to be rotated toward the magnetic tape T by the torsion spring 70, allowing the tension pole 34 to be positioned at a operation position, i.e., a tape tension adjusting position. At the same time, the band brake 40 is arranged on its applying position around the supply reel 26. When the tape tension decreases and the tension lever 30 rotates counterclockwise, the band brake 40 in response thereto applies the braking force on the supply reel 26 to decrease a rotating speed of the supply reel 26. On the other hand, when the tape tension increases and the tension lever 30 is rotated clockwise, the band brake 40 releases the supply reel 26, allowing the supply reel 26 to rotate at its normal rotating speed. That is, the braking force is applied on the supply reel 26 by the band brake 40 whenever the tension pole 34 is rotated counterclockwise from its tape tension adjusting position, whereas no braking force is exerted by the band brake 40, when the tension pole 34 is rotated clockwise from its tape tension adjusting position.

The eccentric cam 60 is incorporated in the inventive tape tension adjusting device to allow the tension lever 30 to adjust the tape tension. That is, if the eccentric cam 60 is rotated by applying, e.g., a screwdriver on the groove 66 of the eccentric cam 60, the pressing force of the torsion spring 70 is changed with the eccentric cam 60, pressing or releasing the pressed piece 36 of the tension lever 30, which, in turn, allows the tension lever 30 to adjust the tape tension with a greater precision.

Although the invention has been shown and described with respect to the preferred embodiments, it will be understood by those skilled in the art that various changes and modifications may be made without departing from the scope of the invention as defined in the following claims.

What is claimed is:

1. A video cassette recorder provided with a tape tension adjusting device, characterized in that the device comprises:

a tension lever for exerting tension on a tape, the tension lever being pivotably mounted on a deck and having a tension pole coming into contact with the tape;

an eccentric cam including a cylindrical body and a shaft eccentrically extending from the cylindrical body, and mounted on the deck through the shaft; and a resilient means for exerting a resilient force on the tension lever, wherein the resilient means is located between the tension lever and the eccentric cam in such a way that the rotation of the eccentric cam changes the pressing force of the tension pole against the tape.

2. The video cassette recorder of claim 1, wherein the resilient means is a torsion spring, one end of the torsion spring coming into contact with the tension lever and the other end thereof coming into contact with the cylindrical body of the eccentric cam.

3. The video cassette recorder of claim 1, wherein the eccentric cam has at top of the cylindrical body a groove on which a driver applies.

4. A video cassette recorder provided with a tape tension adjusting device, characterized in that the device comprises:

a deck having a boss;

a tension lever having a tension pole coming into contact with a tape, a pressed piece and a shaft, the tension lever being rotatably mounted on the deck by inserting the shaft into the boss;

an eccentric cam including a cylindrical body and a shaft eccentrically extending from the cylindrical body, and rotatably mounted on the deck through the eccentric shaft; and a torsion spring for biasing the tension lever toward the tape, wherein one end of the torsion spring comes into contact with the pressed piece of the tension lever and the other end thereof comes into contact with the cylindrical body of the eccentric cam in such a way that the rotation of the eccentric cam changes the pressing force of the tension pole against the tape.

5. The video cassette recorder of claim 1, wherein the eccentric cam has at top of the cylindrical body a groove on which a driver applies.

* * * * *